Patented Sept. 21, 1943

2,330,033

UNITED STATES PATENT OFFICE 2,330,033

METHOD OF PREPARING METHYLENE MALONIC ESTERS

Gaetano F. D'Alelio, Pittsfield, Mass., assignor to General Electric Company, a corporation of New York No Drawing. Application November 16, 1939, Serial No. 304,783

6 Claims. (Cl. 260—485)

This invention relates to the production of organic plastic masses having valuable and characteristic properties that make them especially suitable for use in industry, for example in molding, laminating, casting, coating and adhesive applications and for other purposes. The invention is concerned more particularly with a novel method of preparing methylene malonic esters.

This application is a continuation-in-part of my copending application Serial No. 224,799, filed August 13, 1938, now Patent No. 2,277,479, issued March 24, 1942, wherein the methylene malonic esters (ethylene compounds in which both bonds of the beta carbon atom of the ethylene molecule are attached to two carbon atoms which are at least double bonded) were shown to be very active polymerizing substances. Application Serial No. 224,799 is a continuation-in-part of my copending applications Serial No. 169,465, filed October 16, 1937, now Patent No. 2,239,440, issued Apr. 22, 1941, and Serial No. 205,007, filed April 29, 1938, now Patent No. 2,276,828, issued March 17, 1942. All of these applications are assigned to the same assignee as the present invention.

To the best of my knowledge and belief only dimethyl and diethyl methylene malonic esters heretofore have been known (see Berichte 22, 3295, Annalen 273, 43, and Proceedings of the Chemical Society, 73, 333–340), these having been prepared either from sodium diethyl malonate and methylene iodide, or by the reaction of dimethyl or diethyl malonate with formaldehyde in the presence of a base. These methods have not been satisfactory, since the results were erratic and yielded an average of not more than 10 or 12 per cent of methylene malonic ester, accompanied by a considerable amount of tar.

I have discovered that improved yields of methylene malonic esters, more particularly yields of the order of 30 per cent and higher, can be obtained by reacting (condensing) a malonic ester with formaldehyde in the ratio of one mol of the former to at least one mol of the latter and under alkaline conditions to form a methylol derivative, acidifying the mass, dehydrating the acidified mass to obtain a composition comprising a methylene malonic ester, and separating the methylene malonic ester, as by distillation, from the said composition. The general reaction may be written graphically as follows:

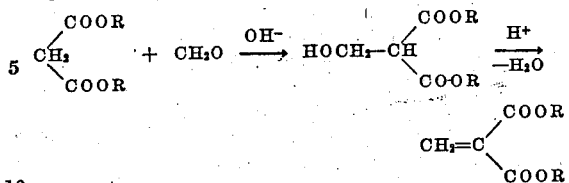

or, with a molecular excess of formaldehyde,

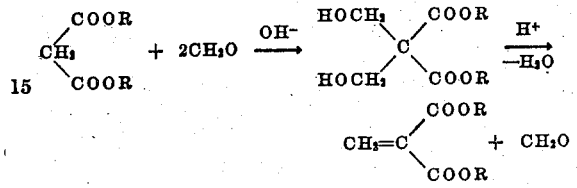

In the above equations R represents an aliphatic or aromatic hydrocarbon radical such as methyl, ethyl, propyl, isopropyl, butyl, amyl, hexyl, octyl, allyl, methallyl, crotyl, phenyl, cyclohexyl, methoxy ethyl, etc.

By the above method I have been able to obtain not only methylene dimethyl and methylene diethyl malonates, but also new and heretofore unknown esters of methylene malonic acid. These esters are useful not only in themselves but I have found that they are particularly adapted for the production of new and useful copolymers by copolymerizing the monomeric or partially polymerized ester with other monomeric or partially polymerized organic compounds containing a $$-CH=C\diagup_{\diagdown}$$

grouping, more particularly a $$CH_2=C\diagup_{\diagdown}$$

grouping, a fact heretofore also unknown.

Illustrative examples of some of the methylene malonic esters which advantageously may be prepared by practicing this invention are methylene dipropyl malonate, methylene diisopropyl malonate, methylene dibutyl malonate, methylene di-(secondary amyl) malonate, methylene di-(secondary butyl carbinyl) malonate, methylene di-(diethyl carbinyl) malonate, etc.

Illustrative examples of some of the malonic esters, many of which are new, which I have prepared and which may be reacted with formaldehyde as above briefly described to obtain substantial yields of the corresponding methylene malonic esters are:

| Malonic ester | Boiling point, ° C. |
| --- | --- |
| Methyl malonate | 181. |
| Ethyl malonate | 198. |
| Propyl malonate | 98.5–99 at 4 mm. pressure. |
| Isopropyl malonate | 93–95 at 12 mm. pressure. |
| Butyl malonate | 128–133 at 5.5 mm. pressure. |
| Secondary amyl malonate | 106–109 at 1 mm. pressure. |
| 2-ethyl butyl malonate | 129–137 at 2.5 mm. pressure. |
| Hexyl malonate | 160–166 at 6 mm. pressure. |
| Methyl isobutyl carbinyl malonate | 123–137 at 4 mm. pressure. |
| Octyl malonate | 188–193 at 4.5 mm. pressure. |
| Allyl malonate | 118–122 at 10 mm. pressure. |
| Alpha ethyl hexyl malonate | 160–195 at 4.5 mm. pressure. |
| Isobutyl carbinyl malonate | 143–146 at 4 mm. pressure. |
| Secondary butyl carbinyl malonate | 142–149 at 3.5 mm. pressure. |
| Diethyl carbinyl malonate | 129–135 at 4 mm. pressure. |
| Methyl propyl carbinyl malonate | 119–123 at 4 mm. pressure. |
| Ethoxy ethyl malonate | 145–149 at 4.5 mm. pressure. |
| Butoxy ethyl malonate | 165–170 at 4.5 mm. pressure. |
| Methoxy ethyl malonate | 129.5–130 at 2 mm. pressure. |
| Methoxy diethylene glycyl malonate | 190–205 at 1.5 mm. pressure. |
| Ethoxy diethylene glycyl malonate | 180–187 at 2.0 mm. pressure. |
| Butoxy diethylene glycyl malonate | 200–222 at 1.5 mm. pressure. |

In carrying the present invention into effect a malonic ester is reacted with formaldehyde or a polyoxymethylene which engenders formaldehyde such as paraformaldehyde, trioxymethylene, etc., at a pH above 7.0 to form a methylol malonic ester, the said reactants being employed in the ratio of at least one mol formaldehyde per mol malonic ester. Usually the malonic ester is caused to react with the formaldehyde or its equivalent in the ratio of one mol of the former to from one to two mols of the latter. The use of higher amounts, for example two and one-half or three or more mols formaldehyde per mol malonic ester is not precluded, but no particular advantage appears to accrue therefrom. After the methylol derivative has formed, further reaction between the components is retarded by bringing the reaction mass to a pH below 7.0. Thereafter the acidified mass is dehydrated to convert the methylol derivative to the corresponding methylene derivative.

In most cases the methylol-forming reaction is carried out at a temperature not exceeding substantially 50° C., preferably between about 0° C. and about 35° C. and in the presence of an inhibitor of polymerization such as copper, copper acetate, hydroquinone, resorcinol, catechol, etc. If desired, the mixed reactants may be heated to the boiling point of the mixture to form the methylol derivative but by such procedure the yields of the methylene derivative are, in general, somewhat lower than when the methylol malonic ester is formed by reacting the components within the temperature range of 0° to 50° C.

In producing the higher molecular weight methylene malonic esters a mutual solvent for the reactants advantageously may be employed. Of course, if desired, any of the malonic esters may be caused to react with formaldehyde or equivalent substance in the presence of a mutual solvent to produce the methylol derivative.

Any organic or inorganic substance having basic properties may be used in obtaining the alkaline conditions necessary to form the methylol derivatives of the malonic esters. Illustrative of such compounds are sodium hydroxide and carbonate, potassium hydroxide and carbonate, barium hydroxide, calcium hydroxide, ammonia, methyl amines such as trimethyl amine, etc., diethyl amine, triisopropyl amine, ethanol amines such as mono-, di- and tri-ethanol amines, pyridine, morpholine, triisopropanol amine, etc. Mixtures of bases also may be used. I prefer to use as the basic catalyst inorganic bases and basic tertiary nitrogen compounds.

To effect acidification of the alkaline condensation product (methylol derivative of the malonic ester) any suitable organic or inorganic acid may be used, for example hydrochloric, sulfuric, phosphoric, oxalic, acetic, acrylic, malonic, crotonic, propionic, chloroacetic, chlorosulfonic, etc. Substances which liberate acids in aqueous solution also may be used, for instance phosphorus trichloride, phosphorus pentachloride, etc. Ac acidifying agents also may be used acid salts such, for example, as sodium diacid phosphate, etc. Mixtures of acidifying agents also may be used.

The methylol derivative is dehydrated by heating at atmospheric or reduced pressures in suitable apparatus, with or without stirring to facilitate the removal of the water, and in the presence or absence of dehydrating agents such, for example, as zinc sulfate, oxalic acid, zinc chloride, ammonium sulfate, anhydrous copper sulfate, etc.

The methylene malonic esters have boiling points only slightly higher than the corresponding malonic esters, and differ therefrom only within about a 10-degree range.

In producing organic plastic masses the methylene malonic esters may be polymerized separately, or mixed with each other, or mixed with other polymerizable bodies. The homogeneous and heterogeneous polymers vary from viscous masses to rubbery and hard, solid bodies, depending upon the extent of polymerization and the particular polymerizable or other modifying agent, if any, which is incorporated therewith. Heat, light, or heat and light may be used to effect polymerization, although under such conditions the rate of polymerization of most of the methylene malonic esters is relatively slow. Hence, to accelerate the polymerization, I prefer to use a catalyst, accompanied by heat, light, or heat and light. Examples of catalysts which may be used are oxygen, ozone, hydrogen peroxide, sulfuric acid, aluminum chloride, boron fluoride, superoxides such as aliphatic acyl peroxides, e. g., acetyl peroxide, stearyl peroxide, etc., peroxides of the aromatic acid series, e. g., benzoyl peroxide, etc. Benzoyl peroxide is the preferred catalyst because of its ease of handling, its relative freedom from explosive hazards and its ready solubility in the monomeric or partially polymerized methylene malonic esters. The rate of polymerization is a function of the temperature and may be carried out at from room temperature (20°–30° C.) to temperatures materially above 100° C., for example about 130° C.

The methylene malonic esters of the saturated aliphatic (including the cycloaliphatic) and the aromatic hydroxy compounds, when polymerized alone, form thermoplastic materials, that is, materials the shape of which can be changed easily by heat. In contrast therewith, most of the methylene malonic esters of unsaturated aliphatic alcohols yield, when polymerized alone, insoluble, infusible or insoluble and infusible bodies.

In general, the properties of the methylene malonic esters depend upon the number of carbon atoms in, and the structure of, the ester grouping. Some of the completely polymerized esters are clear, colorless, rubbery and somewhat ductile resinous bodies. Others are soft, free-flowing, viscous masses at temperatures of about 100° C., yet highly viscous or soft, slightly mobile masses at room temperature. Some possess properties intermediate elastic solids and dense, mobile, viscous masses. While still others, as above indicated, are insoluble, infusible or insoluble and infusible bodies.

In many applications the normally viscous, mobile polymers of high plastic flow are exceptionally valuable, particularly where non-volatilizing materials that can accommodate themselves to the form of the container are required. Particularly are they valuable when used alone, or when dissolved or dispersed in other dielectric materials including a liquid hydrocarbon such as mineral oil. This property of high plastic flow can be used to great commercial advantage in molding processes by interpolymerizing these monomers with other bodies of low plastic flow, thereby imparting the desired flow characteristics to the end-product.

In other cases, for example where it is desired to prepare products of higher softening point or of decreased brittleness and solubility, or to produce insoluble, infusible products, this may be done by copolymerizing a selected monomeric or partially polymerized methylene malonic ester with one or more other polymerizable unsaturated materials in monomeric or partially polymerized state, for example an ester or esters of a polybasic acid in which at least two ester groups each contain an aliphatic unsaturated (ethylenic or acetylenic) hydrocarbon radical, more particularly a

radical such as vinyl, allyl, methallyl, etc. Also, copolymers of valuable properties may be obtained by copolymerizing methylene malonic esters with one or more other monomeric or partly polymerized compounds containing a

grouping, specifically a

grouping, for example, dimethyl itaconate, diethyl itaconate, itaconic esters of unsaturated alcohols, for instance diallyl itaconate, etc., vinyl and allyl esters of saturated and unsaturated mono- and poly-carboxylic acids, etc., more particularly polymerizable materials containing a

grouping, for example monomeric or partly polymerized styrene, vinyl esters such as the acetate, chloride, bromide, fluoride, etc., vinyl ketones, methvinyl ketones, vinylidene halides as the chloride, bromide and fluoride, acrylic and methacrylic esters, e. g., methyl acrylate, ethyl acrylate, propyl acrylate, butyl acrylate, ethyl methacrylate, propyl methacrylate, butyl methacrylate, glycol dimethacrylate, allyl methacrylate, methallyl methacrylate, etc., or mixtures of such substances.

In order that those skilled in the art better may understand how the present invention may be carried into effect, the following illustrative examples are given. All parts are by weight.

Example 1

| | Parts |
|---|---|
| Diethyl malonate | 50.0 |
| Aqueous formaldehyde (37.2%) neutral | 30.22 |
| Sodium hydroxide in 3.6 parts water | 0.15 |
| Acetic acid | 0.45 |

The sodium hydroxide solution was added to the diethyl malonate, followed by the slow addition of the aqueous solution of formaldehyde so that the temperature did not exceed substantially 10° C. The resulting mass (pH above 7.0) was allowed to stand for 24 hours at 15° to 25° C. to form methylol diethyl malonate. Thereafter the acetic acid was added and the solution (pH below 7.0) distilled in the presence of 0.1 part copper sulfate or acetate. Forty-three (43) parts of a water solution, boiling at 95°-98° C. and containing methylene diethyl malonate, was first isolated by distillation at atmospheric pressure. Distillation was then carried out at reduced pressure and there was obtained 33.24 parts of a distillate having a boiling point of 93°-147° C. at 1.5 to 3.5 mm. pressure. The pure methylene malonic ester was isolated from these two fractions by distillation, or it may be isolated by other methods well known to those skilled in the production of pure organic chemical compounds. Only 7.6 parts of a tarry mass was formed as a residue of the distillation.

Methylene dimethyl malonate was prepared in a similar manner.

Example 2

Same formula as in Example 1. The sodium hydroxide was added to the aqueous formaldehyde solution and the resulting solution then added slowly to the diethyl malonate while cooling the mass. The temperature was checked at 33° C. When all the formaldehyde had reacted with the diethyl malonate, the acetic acid was added and the solution distilled as described under Example 1, leaving 8.5 parts of a tarry residue.

Example 3

| | Parts |
|---|---|
| Dipropyl malonate | 10.0 |
| Aqueous formaldehyde (37.2%) neutral | 5.15 |
| Sodium carbonate | 0.3 |
| Acetic acid | 0.34 | were mixed and refluxed for 3½ to 4 hours to form methylol dipropyl malonate, then allowed to cool. The acetic acid was added and the solution treated as described under Example 1. Methylene dipropyl malonate was isolated from the fraction boiling between 83° and 155° C. at 2.5 mm. pressure. This ester started to polymerize spontaneously in the absence of inhibitors.

In a manner similar to that above set forth, numerous other methylene malonic esters were prepared. In all cases the yields were materially higher than when following the practice mentioned in the literature for the preparation of methylene dimethyl and diethyl malonates.

PRODUCTION OF COPOLYMERS

Example 4

| | Parts |
|---|---|
| Methylene diethyl malonate | 10 |
| Ethyl methacrylate | 90 | were mixed and treated with 1 part benzoyl peroxide at 50° C. for 17½ hours and 3¾ hours at 100° C. to give a hard, water-white, glass-clear copolymer. The ethyl methacrylate was replaced by methyl methacrylate and propyl methacrylate to give similar products. Isobutyl methacrylate likewise gave a hard copolymer, only slightly softer than the ethyl methacrylate copolymer. Methacrylic nitrile gave a hard copolymerization product, while the copolymer with butyl methacrylate had definite rubbery characteristics.

Example 5

| | Parts |
|---|---|
| Methylene diethyl malonate | 10 |
| Diallyl itaconate | 90 | were mixed with 1% benzoyl peroxide and heated for 17½ hours at 50° C. and 3¾ hours at 100° C. to give a hard, clear, insoluble and infusible copolymer. Methallyl methacrylate gave a similar product, while the copolymer with glycol dimethacrylate was opaque.

Example 6

| | Parts |
|---|---|
| Methylene diethyl malonate | 10 |
| Vinyl acetate | 90 | were treated with 1% benzoyl peroxide at 50° C. for 17½ hours and at 100° C. for 3¾ hours. The copolymer was quite hard. Methyl acrylate and ethyl acrylate gave gummy, rubbery products.

Example 7

| | Parts |
|---|---|
| Methylene diethyl malonate | 10 |
| Dimethyl itaconate | 90 | were treated similarly to Example 6. A fairly hard copolymer was obtained. Diethyl itaconate gave a softer product; dibutyl itaconate, a very viscous copolymer; dioctyl itaconate, di-isobutyl carbinyl itaconate, di-isoamyl itaconate, and didodecyl itaconate gave moderately viscous resins.

Example 8

| | Parts |
|---|---|
| Methylene diethyl malonate | 10 |
| Diallyl succinate | 90 | were treated similarly to mixtures of Examples 4, 5 and 6 to give resilient, rubbery, friable gels. The diallyl succinate was replaced by diallyl phthalate, triallyl tartrate, diallyl maleate, diallyl malonate, triallyl tricarballylate, diallyl glutarate, diallyl oxalate, triallyl citrate, diallyl alpha allyl malonate, diallyl azelaate, diallyl adipate, and diallyl alpha dimethyl malonate to give similar products.

Example 9

Illustrative copolymers of methylene dipropyl malonate were prepared in the presence of 1 part benzoyl peroxide from:

| | Parts |
|---|---|
| (a) Methylene dipropyl malonate | 20 |
| Methyl methacrylate | 80 | to give a hard copolymer.

| | Parts |
|---|---|
| (b) Methylene dipropyl malonate | 30 |
| Ethyl acrylate | 70 | to give a rubbery copolymer.

| | Parts |
|---|---|
| (c) Methylene dipropyl malonate | 40 |
| Vinyl acetate | 60 | to give a stringy, elastic copolymer.

| | Parts |
|---|---|
| (d) Methylene dipropyl malonate | 40 |
| Diallyl oxalate | 60 | to give a soft, friable gel.

| | Parts |
|---|---|
| (e) Methylene dipropyl malonate | 60 |
| Dibutyl itaconate | 40 | to give a moderately viscous copolymer.

Example 10

These examples illustrate some of the copolymers obtained by treating 20 parts methylene diisopropyl malonate and another polymerizable compound containing a

grouping, specifically a

grouping, with 1 part benzoyl peroxide under the influence of heat:

(a) 80 parts methyl methacrylate gave a hard copolymer.
(b) 80 parts ethyl acrylate gave a stiff, rubbery copolymer.
(c) 80 parts vinyl acetate gave a stringy, fairly stiff copolymer.
(d) 80 parts diallyl oxalate gave a friable, resilient gel.
(e) 80 parts diethyl itaconate gave a rubbery, stringy copolymer.

Example 11

20 parts methylene dibutyl malonate when mixed with 80 parts (a) Methyl methacrylate
(b) Ethyl acrylate, or
(c) Dibutyl itaconate and treated with 1 part benzoyl peroxide at 50°–100° C. for 24–72 hours gave, respectively:

(a) A hard copolymer.
(b) A stiff, rubbery copolymer.
(c) A viscous copolymer.

Example 12

20 parts methylene di-(secondary amyl) malonate, when mixed with 80 parts (a) Ethyl acrylate
(b) Methyl methacrylate
(c) Allyl oxalate
(d) Vinyl acetate, or
(e) Diethyl itaconate and treated with 1 part benzoyl peroxide at 50°–100° C. for 9 to 48 hours gave, respectively:

(a) A fairly stiff resilient copolymer.
(b) A hard copolymer.
(c) A resilient friable gel.
(d) A stiff, rubbery, stringy copolymer.
(e) A gummy, rubbery copolymer.

Example 13

20 parts methylene dihexylmalonate, when mixed with 80 parts (a) Diethyl itaconate
(b) Diallyl oxalate
(c) Vinyl acetate
(d) Ethyl acrylate, or
(e) Methyl methacrylate and treated with 1 part benzoyl peroxide at 50°–100° C. for 9–54 hours gave, respectively:

(a) A moderately viscous copolymer.
(b) A rubbery gel.
(c) A soft, translucent gel.
(d) A stiff, rubbery copolymer.
(e) A hard, opaline copolymer.

Similar copolymers were obtained when methylene di-(secondary butyl carbinyl) malonate or methylene di-(methyl carbinyl) malonate was used in place of methylene dihexyl itaconate.

Example 14

| | Parts |
|---|---|
| Methylene dibutyl malonate | 20 |
| Benzoyl peroxide | 1 |
| Polyhydric alcohol ester of an alpha unsaturated alpha beta polycarboxylic acid [1] | 80 |

[1] Note.—This polyhydric alcohol ester was prepared by effecting reaction between equal molar parts of maleic anhydride and diethylene glycol. The reactants were mixed in a suitable apparatus and the temperature raised to 200° C. over a period of one hour. Heating was continued for six hours at 200° to 210° C., at the end of which time there was obtained a viscous pourable resin having an acid number of about 27.

The methylene dibutyl malonate was copolymerized with the above-described polyhydric alcohol ester at 90° C., yielding a soft gel at the end of 40 minutes and a hard copolymer within two hours. This copolymer was exceptionally hard and abrasion-resistant after heating for a total of 17 hours at 90° C.

Example 15

| | Parts |
|---|---|
| Methylene diisopropyl malonate | 20 |
| Diethylene glycol maleate resin prepared as described in Example 14 | 80 |
| Benzoyl peroxide | 1 | were treated at 90° C. for 1 hour and 50 minutes to give a soft gel-like copolymer. Continued heating for 17 hours at 90° C. gave a hard copolymer.

Example 16

| | Parts |
|---|---|
| Methylene di-(secondary amyl) malonate | 20 |
| Diethylene glycol maleate resin prepared as described in Example 14 | 80 |
| Benzoyl peroxide | 1 | were heated together at 90° C. for 17 hours to give a hard copolymer.

Example 17

| | Parts |
|---|---|
| Methylene dihexyl malonate | 20 |
| Diethylene glycol maleate resin prepared as described in Example 14 | 80 |
| Benzoyl peroxide | 1 | were heated at 90° C. for 40 minutes to give a soft gel which became hard within two hours. When heated at 90° C. for 17 hours, it was exceptionally hard.

Example 18

| | Parts |
|---|---|
| Methylene di-(secondary butyl carbinyl) malonate | 20 |
| Diethylene glycol maleate resin prepared as described in Example 14 | 80 |
| Benzoyl peroxide | 1 | were heated for 2 hours at 90° C. to give a soft gel, which became a hard copolymer after 17 hours.

Example 19

| | Parts |
|---|---|
| Methylene diethyl carbinyl malonate | 20 |
| Diethylene glycol maleate resin prepared as described in Example 14 | 80 |
| Benzoyl peroxide | 1 | were heated for 1 hour and 5 minutes at 90° C. to give a soft gel. When heated for 17 hours at 90° C. a hard copolymer was formed.

Illustrative examples of other polyhydric alcohol esters of alpha unsaturated alpha beta polycarboxylic acids which may be copolymerized with methylene malonic esters to provide new and useful compositions, which are claimed in my divisional application Serial No. 485,178, filed April 30, 1943, are: ethylene glycol maleate, triethylene glycol maleate, glyceryl maleate, ethylene glycol fumarate, diethylene glycol fumarate, triethylene glycol fumarate, propylene glycol fumarate, glycol itaconate, diethylene glycol itaconate, triethylene glycol itaconate, tetraethylene glycol itaconate, glyceryl itaconate or modifications of these esters produced by incorporating therein non-ethylenic polybasic acids such as the saturated aliphatic acids, e. g., malonic, succinic, glutaric, adipic, pimelic, suberic, sebacic, etc., the aromatic polybasic acids such as phthalic, di-, tetra- and hexa-hydrophthalic, naphthalene dicarboxylic, etc., or mixtures of such acids.

The addition of as little as 0.1 part of a polyallyl ester of a polycarboxylic acid, specifically diallyl itaconate, to mixed monomers or partial polymers of a methylene malonic ester and at least one other polymerizable compound containing a

grouping, as for instance esters of acrylic and alkacrylic acids, vinyl compounds such as vinyl acetate, etc., yields upon copolymerization of the mixture interpolymers of increased solvent-resistance, heat-resistance or heat- and solvent-resistance. By suitably increasing the percentage proportion of such diallyl esters, as for instance to proportions of the order of 10% to 50% or more by weight of the whole, insoluble infusible interpolymers can be produced.

The methylene malonic esters, as well as the interpolymers obtained by copolymerizing these esters with other polymerizable bodies, have a wide range of properties. Their hardness and solubilities may be varied over a considerable range from fluid compositions of varied intrinsic viscosity or soft, flexible bodies to hard, rigid masses that can be swelled or dissolved in many volatile and non-volatile solvents, even those of a hydrocarbon nature. By suitable selection of the starting monomeric or partly polymerized materials, interpolymers can be obtained in an insoluble, infusible state practically resistant to the destructive effect of other chemical bodies such as acids, bases, solvents and the like.

When a plasticizing effect is desired in some other synthetic or natural plastic or potentially plastic material, the methylene malonic esters containing at least three carbon atoms in the alcohol residue of the ester are particularly suitable for that purpose. High molecular weight bodies such as polyvinyl halide, e. g., polyvinyl chloride, etc., cellulose esters such as the acetate, propionate, butyrate, etc., cellulose ethers such as ethyl cellulose, benzyl cellulose, etc., polymethyl methacrylate, polystyrene, etc., may be plasticized by incorporating therewith such methylene malonic ester in monomeric, partially polymerized or completely polymerized state, in the presence or absence of a catalyst such as benzoyl peroxide when the monomeric or partially polymerized forms are used. The methylene malonic ester may be incorporated into the high molecular weight body to be plasticized by simple mechanical agitation or by the use of mutual solvents, followed by the standard mechanical processes known in the plastics art. These bodies then may be subjected to further heat and pressure treatment if desired.

The methylene malonic esters may be converted to polymers or interpolymers in molds with or without the application of pressure, in the presence or absence of a material which is a solvent for the monomer but not for the polymer, or one which is a solvent for both monomer and polymer, or one which is not a solvent for either the monomer or polymer so that spongy or granulated polymeric modifications are obtained.

The solid, thermoplastic polymers and copolymers of this invention, with or without modifying agents, may be used in injection, compression, or transfer molding processes to make numerous articles for industrial, technical and novelty use and other applications.

As modifying agents various fillers may be used, for example wood flour, alpha flock, sand, asbestos, mica, paper, cloth, cellulose derivatives such as cellulose itself, regenerated cellulose, cellulose esters, cellulose ethers, natural and synthetic filaments or fibers, etc., in continuous, shredded, or comminuted form. Pigments, dyes, opacifiers, plasticizing substances, such as dibutyl phthalate, esters of monobasic and polybasic acids, etc., may be incorporated into the polymers and copolymers to modify the same. Natural and synthetic resins, gums, oils, waxes, polyhalogenated aromatic derivatives, etc., likewise may be added as modifying agents.

In solvents, or without solvent utilizing a melt process, the fusible polymers may be used in adhesive and laminating applications to bond paper, wood, mica flakes, glass sheets, rubber sheets, etc., fibrous materials such as silk, asbestos, glass fibers, synthetic fibers in filament, thread or fabric (woven or felted) form, etc., cellulose derivatives in sheet, comminuted or fiber form, etc. In the form of liquid coating compositions such as lacquers, enamels, varnishes, etc., they find application in surface protective coatings, such as for walls, desks, wire, concrete, porcelains, etc. In a flowable condition without the use of solvents they may be used as impregnants for many porous bodies, such as cork, pottery, felts, or fabricated bodies with interstices, such as the windings of electrical coils, netted fiber, interwoven fibrous materials, etc.

When the monomers of this invention are copolymerized with, for example, diallyl itaconate in the presence of another non-polymerizable body which acts as a solvent for these monomers, there results a homogeneous gelled material which firmly binds the solvent so as to reduce to a minimum evaporation losses of the solvent. Illustrative of non-polymerizable bodies which thus may be gelled are butyl alcohol, benzene, ethylene dichloride, the monohalogenated aromatic hydrocarbons or mixtures of halogenated aromatic hydrocarbons, ethylene glycol, mineral oils including lubricating oils, etc.

The term "formaldehyde" as used generally herein and in the appended claims is intended to include within its meaning formaldehyde, HCHO, and polymeric modifications thereof.

What I claim as new and desire to secure by Letters Patent of the United States, is:

1. The process of producing a composition comprising a methylene malonic ester which comprises reacting a malonic ester with formaldehyde in the ratio of one mol of the former to at least one mol of the latter and under alkaline conditions to form a methylol derivative, acidifying the mass and dehydrating the acidified mass to obtain a composition comprising a methylene malonic ester.

2. The process of preparing a methylene malonic ester which comprises effecting reaction between a malonic ester and formaldehyde in the ratio of one mol of the former to at least one mol of the latter and under alkaline conditions to form a methylol derivative, acidifying the mass, dehydrating the acidified mass to obtain a composition comprising a methylene malonic ester and separating the methylene malonic ester from the said composition.

3. The method of preparing a methylene malonic ester which comprises forming a mixture having a pH above 7.0 and comprising a malonic ester and formaldehyde in the ratio of one mol of the former to at least one mol of the latter, effecting reaction between the components of the said mixture at the said pH to form a methylol derivative, said reaction being carried out at a temperature not exceeding substantially 50° C., retarding the reaction between the said components by bringing the reaction mass to a pH below 7.0, dehydrating the resulting mass to form a composition comprising methylene malonic ester and separating the methylene malonic ester from the said composition.

4. The method of preparing a methylene malonic ester which comprises reacting, at a pH above 7.0, an aqueous solution of formaldehyde with a malonic ester in the ratio of one mol of the malonic ester to at least one mol of formaldehyde thereby to form a methylol malonic ester, said reaction being carried out at a temperature between about 0° C. and about 35° C. and in the presence of an inhibitor of polymerization, bringing the resulting mass to a pH below 7.0 to retard further reaction between the said components, and distilling the resulting mass to dehydrate the same and to obtain therefrom a methylene malonic ester.

5. The process of preparing methylene dimethyl malonate which comprises effecting reaction between dimethyl malonate and formaldehyde in the ratio of one mol of the former to at least one mol of the latter and under alkaline conditions to form methylol dimethyl malonate, acidifying the mass, dehydrating the acidified mass to obtain a composition comprising methylene dimethyl malonate and separating the methylene dimethyl malonate from the said composition.

6. The process of preparing methylene diethyl malonate which comprises effecting reaction between diethyl malonate and formaldehyde in the ratio of one mol of the former to at least one mol of the latter and under alkaline conditions to form methylol diethyl malonate, acidifying the mass, dehydrating the acidified mass to obtain a composition comprising methylene diethyl malonate and separating the methylene diethyl malonate from the said composition.

GAETANO F. D'ALELIO.